April 28, 1970   W. SCHICHT   3,509,439
EXCITER ARRANGEMENT FOR SYNCHRONOUS MOTORS
Filed April 22, 1968

INVENTOR
Werner Schicht

BY Pierce, Scheffler & Parker
ATTORNEYS

United States Patent Office 3,509,439
Patented Apr. 28, 1970

3,509,439
EXCITER ARRANGEMENT FOR
SYNCHRONOUS MOTORS
Werner Schicht, Birr, Switzerland, assignor to Aktiengesellschaft Brown, Boveri & Cie, Baden, Switzerland, a joint-stock company
Filed Apr. 22, 1968, Ser. No. 723,156
Claims priority, application Switzerland, Oct. 3, 1967, 13,808/67
Int. Cl. H02p 1/50
U.S. Cl. 318—183                                   7 Claims

ABSTRACT OF THE DISCLOSURE

An arrangement for controlling excitation of the field coil on the rotor of a synchronous motor during starting as well as during running at synchronous speeds includes a first rectifier circuit on the rotor including controlled and uncontrolled rectifier elements connected to supply current to the motor field coil and at least one resistance element connected in parallel therewith, an exciter alternator also on the rotor which feeds the rectifiers of the first rectifier circuit but which has a stationary field winding, an auxiliary rectifier circuit including diodes and voltage control Zener diodes also fed from the exciter alternator via an isolating transformer and which apply igniting pulses to the control electrodes of the controllable rectifiers of the first rectifier circuit, and a switching device responsive to the speed attained by the rotor of the motor for energizing the stationary field winding of the exciter alternator. During starting up, asynchronous operation of the motor, a balanced alternating current flows through the field coil of the rotor, and after a near synchronous speed has been attained, the field winding of the exciter alternator is connected in thus establishing an A.C. output from the latter which then feeds unidirectional current through the motor field coil by way of the rectifiers of the first rectifier circuit.

---

This invention relates to a synchronous motor without slip rings and which is provided with a revolving field winding fed from an exciter through co-rotating rectifiers.

In synchronous machines (generators or motors) without slip rings, the armature of an exciter machine for the field winding revolves with the shaft. Here the exciter is designed as an A-C generator machine which feeds the field winding of the synchronous machines through rectifiers.

In self-starting synchronous motors, the difficulty arises that the A-C voltage induced in the field winding during the starting can discharge in only one direction due to the rectifier. The direct current thus produced builds up a rotor field which induces speed-frequency stator currents which reduce the torque upon starting, especially in the case of low speeds of rotation.

For this reason, controllable current rectifier elements have been additionally provided which short-circuit the exciter winding in each half-wave during the starting, which keep the voltage generated in the exciter away from the rectifier (U.S. Patent 3,100,279).

In another form of construction, controlled semi-conductors are connected antiparallel with the rectifiers during the starting, so that the induced A-C voltage in both half-waves can produce a current; then an alternating current flows in the exciter winding which does not influence the starting torque (U.S. Patent 3,098,959).

One of these solutions requires at least three additional thyristors, of which at least one must be designed for the full exciter current. The other solution has only two additional thyristors, but its disadvantage is that the starting torque does not have the most favorable value, or a resistance required for this must be bridged after the starting by a thyristor which would then have to be designed for the full exciter current.

According to the invention, it is now proposed that at least a part of the current rectifier elements is controlled, that at least one resistance is connected in parallel with the motor field winding, that a control device is connected to the exciter machine, which can consist of an isolating transformer and additional diodes as auxiliary rectifiers with load resistances, and that the control voltages for the controlled current rectifiers are tapped from the diodes of each phase.

With this solution, no thyristor needs to be designed for the full exciter current. In addition, it has the advantage that the control devices can be constructed alike independently of the data of the motors, and that only the ratio of the isolating transformer needs to be adapted for different motor applications.

Figure 1:
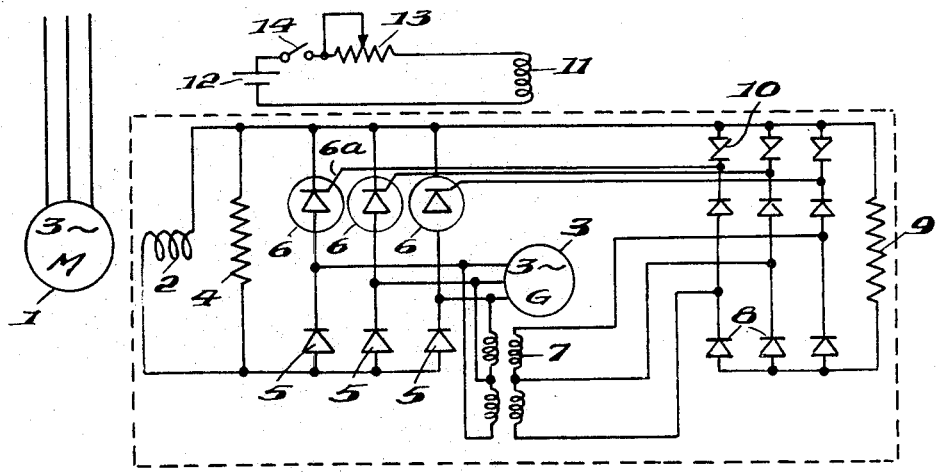
Figure 2:
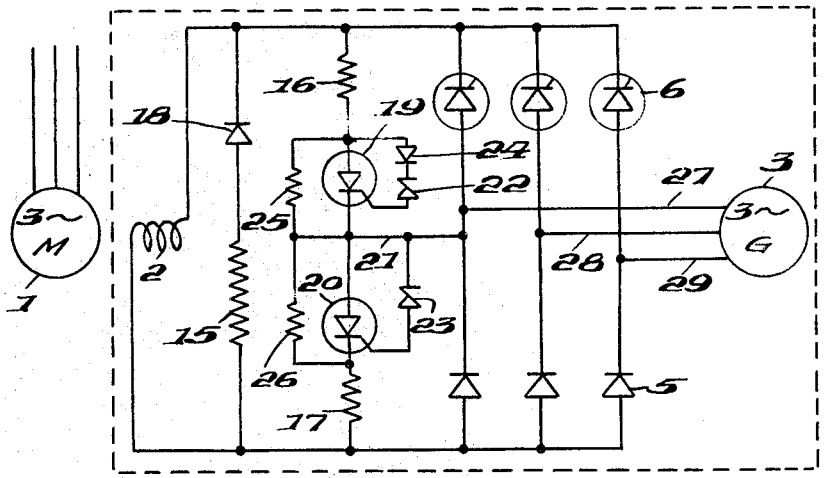

The foregoing, as well as other objects and advantages inherent in the invention will become more apparent from the following detailed description of two embodiments thereof and from the accompanying drawings wherein:

FIG. 1 is a schematic electrical circuit diagram illustrating one embodiment wherein a single resistance element is connected in parallel with the field coil on the rotor of the synchronous machine; and FIG. 2 is a view similar to FIG. 1 but wherein a plurality of resistance elements are selectively connected in parallel with the field coil of the synchronous machine.

With reference now to the drawings, and to FIG. 1 in particular, the stator of the synchronous machine is indicated at 1 and the rotor, which has no slip rings, is provided with a field coil indicated at 2. All components included within the broken line rectangle revolve with the rotor. These include a 3-phase exciter element i.e., alternator 3, a resistance 4 which is connected permanently in parallel with field coil 2, and a 3-phase rectifier circuit feeding field coil 2, the rectifier circuit having a plurality of uncontrolled diodes 5 and controlled diodes 6 fed by the output from alternator 3. Additionally mounted on the rotor are a control device comprising a V-connected isolating transformer 7, auxiliary 3-phase rectifiers 8, an associated load resistance 9 and a 3-phase arrangement of Zener diodes 10.

The 3-phase exciter alternator 3 is provided with a stationary field coil 11 fed from a unidirectional current source 12 through a variable resistance 13 and a switch 14 which is opened and closed as a function of the speed of the synchronous motor. The unidirectional current source 12 can also consist of a rectifier arrangement fed from the alternating current network to which the synchronous motor 1 is connected. The auxiliary rectifiers 8 and load resistance 9 are needed only to establish the control current for rectifiers 6.

During the starting of motor 1, and before synchronization is reached, an alternating voltage of decreasing frequency is produced in the field coil 2 and causes a current to circulate through the paralleled resistance element 4. The alternating current thus produced does not influence the torque of the motor. As long as the exciter alternator 3 does not generate a voltage, or only a very small voltage as would be produced by stator remanence, rectifiers 8 connected to the secondary side of isolating transformer 7 transmit zero or insufficient voltage to ignite the controlled diodes 6. However, as the speed of the rotor of the synchronous machine increases and reaches a speed close to its synchronous value, a voltage is applied to the field coil 11 of the exciter alternator 3 by closure of the contacts of the speed-responsive switch 14, and the output voltage of alternator 3 increases rapidly. Consequently, the voltage applied by this alternator to the primary of the isolating transformer 7 and hence also to the rectifiers 8 also rapidly increases with the result that the voltage applied from rectifiers 8 to the control elements 6a of the rectifiers 6 will now be sufficient to cause the rectifiers 6 to ignite thus establishing unidirectional current flow through the motor field coil 2 and resistance 4 in parallel with it. The Zener diodes 10 serve to prevent an excessive increase in the control voltage applied to the control elements 6a of rectifiers 6.

FIG. 2 illustrates a modified construction wherein a plurality of resistance elements are connected in parallel with the motor field coil. A disadvantage of the circuit depicted in FIG. 1 is that the resistance 4 remains permanently in circuit with the motor field coil 2 thus causing continuous wattage losses. To avoid this, the paralleling resistance is divided into a plurality of parts connected with the diodes and controlled rectifiers. In FIG. 2, only the circuit between motor field coil 2 and the exciter alternator have been included in order to simplify the drawing. The other circuit components such as the isolating transformer 7, rectifiers 8 and Zener diodes 10, as well as field winding 11, switch 14 and D.C. source 12, are connected up in the same manner as for the FIG. 1 circuit. Instead of a single, motor field coil paralleling resistance component such as resistance 4 of FIG. 1, three resistance elements are employed, these being resistances 15, 16 and 17. Resistance element 15 is series-connected with a diode 18, and these two elements are in parallel with the motor field coil 2. Resistances 16 and 17 are series-connected with controllable current rectifiers, i.e. thyristors 19 and 20, respectively and this whole series path lies in parallel with the motor field coil 2. The center point 21 of the series-circuit is connected with one phase of the rectifier arrangements 5, 6. The firing of the controllable rectifiers 19, 20 is determined by circuitry which includes Zener-diodes 22 and 23, a diode 24, associated with rectifier 19 and auxiliary resistances 25, 26 connected respectively across rectifiers 19 and 20, and which function as voltage controllers.

The mode of operation of the FIG. 2 circuit is as follows:

The voltage induced in one direction in motor field coil 2 during starting of the motor feeds a current through diode 18 and resistance 15. The voltage induced in coil 2 in the other direction feeds current through the controllable rectifiers 19, 20, and the resistances 16 and 17. The sum of the values of resistance elements 16 and 17 is equal to the value of resistance 15 so that the motor field coil 2 sees a balanced load for both half waves. The field coil 2 then carries an alternating current, which does not influence the starting torque. When the speed of the motor 1 approaches its synchronous value, the exciter alternator 3 is then excited by the same arrangement described with respect to the embodiment of FIG. 1 thus to apply voltages to the rectifiers 5, 6 via lines 27, 28 and 29. As soon as the phase line 27, which is connected to the center point 21, attains the highest potential of all three lines, thyristor 19 is reverse-polarized and switches off the current flow through resistance 16. As soon as phase line 27 reaches the lowest potential of all three lines, thyristor 20 becomes reverse-polarized, and switches off the current flow through resistance 17. The Zener-diodes 22, 23 are so chosen that thyristors 19 and 20 can be relied upon not to ignite at the rated exciter voltage, but only at a higher voltage, such as is induced during slipping. In synchronous operation therefore, resistances 15, 16 and 17 do not carry a current, in contrast to the resistance 4 of the arrangement according to FIG. 1.

If desired, some simplification of the isolating transformer 7 can be achieved by providing an auxiliary winding in the exciter alternator 3 itself, the voltage induced in this winding being applied to the auxiliary rectifiers 8.

I claim:
1. In a self-starting synchronous motor, the combination comprising a rotor element having a field coil, at least one resistance element connected in parallel with said field coil, a first rectifier arrangement mounted on said rotor element, said first rectifier arrangement including controlled and uncontrolled rectifier elements connected to supply current to said motor field coil and its paralleled resistance element, an exciter alternator having its output windings on said rotor connected to feed said first rectifier arrangement and a stationary field winding, means responsive to the speed attained by said rotor element for effecting energization of the field winding of said exciter alternator, an auxiliary rectifier arrangement on said rotor element comprising diodes, a load resistance connected to said diodes, connections between the output sides of said diodes and the control elements of said controlled rectifier elements of said first rectifier arrangement for controlling the firing thereof, and circuit connections including an isolating transformer between the input sides of said diodes and the output of said exciter alternator.

2. A self-starting synchronous motor as defined in claim 1 and wherein an isolating transformer is interposed in said circuit connections between the input sides of said diodes and the output of said exciter alternator.

3. A self-starting synchronous motor as defined in claim 1 and which further includes Zener diodes connected between the control elements and the cathodes of said controlled rectifier elements.

4. A self-starting synchronous motor as defined in claim 1 and wherein a plurality of resistances are connected in parallel with said field coil on the motor rotor, each said resistance including a rectifier arranged in series therewith.

5. A self-starting synchronous motor as defined in claim 4 wherein the rectifiers connected in series with said resistance elements are oppositely poled so as to have opposite current carrying directions.

6. A self-starting synchronous motor as defined in claim 4 wherein first and second paralleling resistance circuits are provided, said first resistance circuit being comprised of a single resistance element and a diode in series therewith, and said second resistance circuit being comprised of a pair of resistance elements each of which is connected in series with a diode controlling the passage of current therethrough, the diodes of said second resistance circuit being poled in the opposite sense from the diode of said first resistance circuit.

7. A self-starting synchronous motor as defined in claim 1 wherein said isolating transformer is constituted by an auxiliary winding in said exciter alternator.

References Cited

UNITED STATES PATENTS 3,354,368 11/1967 Williamson ____ 318—193 XR
3,383,575 5/1968 Bobo _____ 318—193 XR
3,406,323 10/1968 Jordan _____ 318—193 XR ORIS L. RADER, Primary Examiner G. RUBINSON, Assistant Examiner U.S. Cl. X.R.
318—193